United States Patent [19]

Winnike

[11] Patent Number: 5,294,090
[45] Date of Patent: Mar. 15, 1994

[54] VALVE SNUBBER

[75] Inventor: Don Winnike, Benton, Ark.

[73] Assignee: Orbit Valve Company, Little Rock, Ark.

[21] Appl. No.: 981,404

[22] Filed: Nov. 25, 1992

[51] Int. Cl.$^5$ ............... F16K 31/128; F16K 51/00
[52] U.S. Cl. ............................... 251/36; 92/12; 92/143; 251/47; 251/58; 251/61.2
[58] Field of Search ................. 92/8, 12, 13.6, 62, 92/85 B, 85 R, 143; 251/36, 47, 48, 50, 51, 55, 58, 54, 61.2, 229

[56] References Cited

U.S. PATENT DOCUMENTS

| 192,273 | 6/1877 | Nash | 251/47 |
|---|---|---|---|
| 655,342 | 8/1900 | Gulland | 251/47 |
| 740,704 | 10/1903 | Singer | 251/55 |
| 846,692 | 3/1907 | Parsons et al. | 251/47 |
| 937,484 | 10/1909 | Sturgess | 251/36 |
| 989,543 | 4/1911 | Geissinger | 251/54 |
| 1,005,713 | 10/1911 | Killin | 251/54 |
| 1,501,331 | 7/1924 | Gulick | 251/36 |
| 1,804,060 | 5/1931 | Morrill | 251/36 |
| 2,601,578 | 6/1952 | Witt | 251/47 |
| 2,650,572 | 9/1953 | Amstutz | 92/85 B |
| 3,190,077 | 6/1965 | Scholin | 92/8 |
| 3,207,468 | 9/1965 | Lauducci et al. | 251/58 |
| 3,410,307 | 11/1968 | Szereszewski | 251/51 |
| 3,672,628 | 6/1972 | Aanstad | 92/143 |
| 4,869,458 | 9/1989 | Susini eet al. | 92/62 |
| 4,934,652 | 6/1990 | Golden | 92/62 |

FOREIGN PATENT DOCUMENTS 379807  7/1973  U.S.S.R. ............................ 251/47

Primary Examiner—George L. Walton
Attorney, Agent, or Firm—Hill, Steadman & Simpson

[57] ABSTRACT

A snubber which may be used with a diaphragm actuator or other movable member to prevent sudden movement of the movable member is provided. A typical diaphragm actuator has a diaphragm housing with a movable diaphragm therein dividing the diaphragm housing into two separate chambers. An actuator stem is connected to the diaphragm to move with the diaphragm. The snubber has a housing with an open interior space communicating through a communication path with a first one of the actuator chambers. A first piston is reciprocably movable within the snubber housing, the first piston being operably connected to the actuator stem to move therewith. The first piston divides the snubber housing space into two chambers, one on each side of the first piston. A passage is provided which leads from one of the snubber chambers to the other. A floating piston positioned in the communication path between the first piston and the first actuator chamber. Thus, as the first piston reciprocates within the snubber space, the floating piston moves in an opposite direction to accommodate the changing volume within the snubber space occasioned by the movement of the first piston into and out of the snubber space.

20 Claims, 2 Drawing Sheets

VALVE SNUBBER

BACKGROUND OF THE INVENTION

The present invention relates to a valve snubber and more particularly to a snubber for a diaphragm operated valve.

In diaphragm valve actuators wherein air is used to drive the diaphragm between an open and a closed position, the diaphragm is subject to "jumping" or sudden and abrupt movements due to the high forces involved in the opening and closing of the valves and the high pressures in the lines controlled by the valves. This abrupt movement of the diaphragm subjects the diaphragm to increased wear and can create loud noises during the operation of the actuator.

While it is known to use adjustable bleed controls on the air inlets and outlets to the diaphragm chamber to govern the speed of operation of the diaphragm actuator, such air bleed controls are not always sufficient to prevent the sudden and abrupt movement of the diaphragm.

Therefore, it would be advantageous for there to be provided a device to prevent the sudden abrupt movement of the diaphragm in a diaphragm actuator, while assuring smooth continuous movement of the diaphragm between an open and closed position.

SUMMARY OF THE INVENTION

The present invention provides a snubber for a pneumatic actuator which dampens any sudden movement of the diaphragm, yet which permits continuous controlled movement of the diaphragm between an open and closed position.

A grease filled snubber housing is attached to the actuator casing having an axis parallel to the area of the diaphragm. A piston on a stem is attached to the actuator stem and extends into the grease filled housing. A piston ring is carried on the piston which provides a very close tolerance between the piston and the interior walls of the housing. A narrow passage is provided in the housing wall having an outlet axially above and below the extent of travel of the piston ring such that as the piston ring is oscillated within the housing due to movement of the diaphragm, the grease is caused to flow through the passage. A throttle screw is provided in the passage to adjust the speed at which the grease flows.

A second, floating piston is provided in the snubber housing with one face of the floating piston exposed to the air within the actuator and the opposite face being exposed to the grease within the cylinder. This floating piston is designed to move to accommodate the varying volume within the housing due to the insertion and removal of the piston stem.

DETAILED DESCRIPTION OF THE PREFERRED EMBODIMENTS

Figure 1:
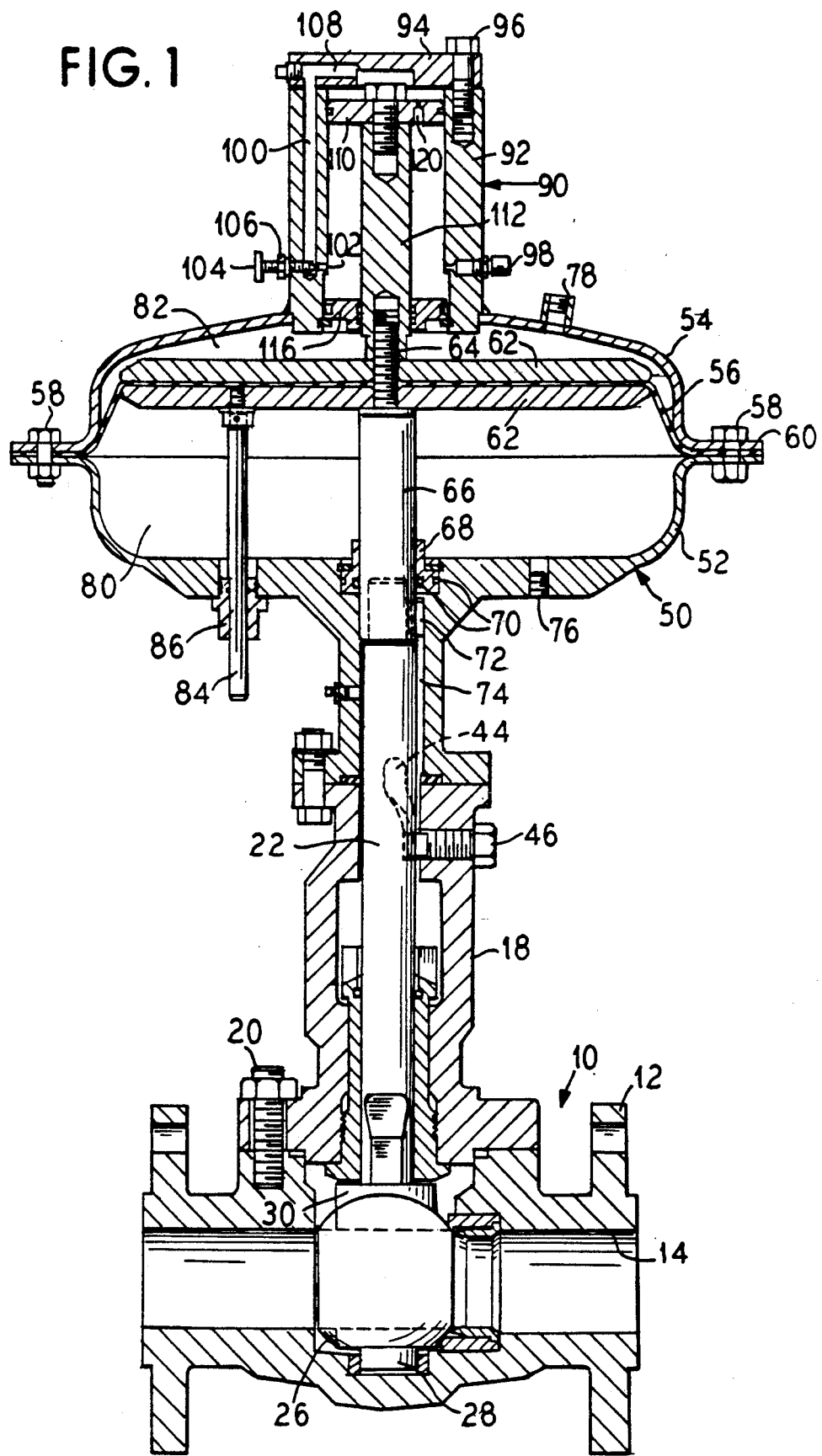
FIG. 1 is a side sectional view of a valve and diaphragm actuator incorporating a snubber utilizing the principles of the present invention.

FIG. 1 shows a valve 10, the operation of which is generally disclosed in U.S. Pat. No. 3,515,371 incorporated herein by reference. The valve 10 has a valve body 12 with an axial bore 14. An open top 16 is covered by a valve bonnet 18 by a plurality of studs and nuts 20. Disposed axially through the valve bonnet 18 and extending down into the valve body is a valve stem 22. Located within the body 16 is a valve core 26 such as a ball. The ball provides a trunnion 28 on a bottom end thereof, and a neck 30 on a top end. The neck 30 provides a top aperture for receiving a bottom end of the valve stem 22.

The valve stem 22 has a spiral slot 44 on an outside surface thereof into which is fit a stem guide 46 which is threaded into and through the bonnet 18. The spiral slot 44, as described more particularly in the aforementioned reference, allows the stem to be selectively moved axially and rotationally to accomplish the desired opening and closing sequence for the valve.

Axial movement of the valve stem 22 can be accomplished through the use of a wide variety of actuators. Although a double acting pneumatic diaphragm actuator is illustrated as an exemplary environment for the snubber, many other types of actuators could be controlled by a snubber incorporating the principles of the present invention as described below. A list of such other actuator types, which is not an exhaustive list, would include those actuators as have been manufactured by Orbit Valve Company and referred to as: double acting diaphragm actuator, double acting diaphragm actuator with manual close mechanism, double acting diaphragm actuator with two-way manual mechanism, diaphragm actuator with spring open mechanism, diaphragm actuator with spring open and manual close mechanism, double acting piston actuator, double acting piston actuator with manual close mechanism, and double acting piston actuator with two-way manual mechanism.

The pneumatic diaphragm actuator illustrated is comprised of two housing parts 52, 54 which capture a flexible diaphragm 56 therebetween. Threaded fasteners 58 provide a clamping action on a flange area 60 of the housing part to sandwich the diaphragm therebetween. A pair of diaphragm plates are clamped together to sandwich the diaphragm member 56 therebetween. A threaded portion 64 of an actuator stem 66 extends through the plates. The actuator stem 66 is threadingly received on the valve stem 22 to move axially in tandem with the valve stem. The actuator stem 66 is carried in a bearing 68 mounted to the diaphragm housing member 52 to provide axial guidance for the actuator stem. Appropriate seals 70 are provided along the bearing to prevent leakage of any gas along the actuator stem. A key 72 is provided between the actuator stem 66 and the housing part 52 to follow along a key way 74 in the housing part 52 to prevent rotation of the actuator stem 66.

A first air inlet/outlet 76 is provided in the diaphragm housing part 52 and a second air inlet/outlet 78 is provided in the housing part 54. These air inlets/outlets are selectively used to pressurize a chamber 80 formed below the diaphragm to open the valve or a chamber 82 above the diaphragm to close the valve.

A visual position indicator rod 84 is threadingly attached to one of the diaphragm plates 62 and extends through a sealed bushing 86 in a wall of the diaphragm housing part 52. A portion of the rod 84 extends beyond the housing and gives a visual indication of the position of the diaphragm.

Positioned on top of the diaphragm actuator is a snubber 90 which has a housing 92 which may preferably be formed of a hollow cylinder. A top wall member or cover 94 is secured to a top end of the cylinder 92 by appropriate fastening means such as cap screws 96. A grease inlet fitting 98 is provided through the wall of the cylinder 92. A passage 100 is formed axially within the wall of the cylinder 92 and has an inlet 102 formed perpendicular to the passage 100 and extending into the interior space of the cylinder 92. A threaded throttle screw 104 has a tapered forward edge which can seat against the opening between the passage 100 and the inlet 102 to permit adjustment of the cross sectional area of the passage between the inlet 102 and passage 100. A sealing locknut 106 is carried on the throttle screw to lock the screw in a desired axial placement.

A second passage 108 is provided in the cover 94 which communicates with the passage 100 and with the interior space of the cylinder 92 to complete the loop. A piston head 110 is bolted onto a piston stem 112. The piston head 110 has an external diameter just slightly less than an internal diameter of the cylinder 92. A piston ring 114 is carried in the piston head to provide an effective seal with the interior wall of the cylinder 92. The piston stem 112 threadingly engages with the threaded portion of the actuator stem 66 to clamp the diaphragm plates 62 on to the diaphragm. The piston head 110 can therefore be reciprocated within the interior of the cylinder 92. The inlet 102 through the side wall of the cylinder 92 is positioned below the lowermost travel position of the piston head 110. Thus, the piston head 110 is always positioned between the inlet 102 and the top wall 94 covering the cylinder 92. The piston head 110 has a small stepped passage 120 formed therein to provide a small bleed hole through the piston head.

A second, floating piston 116 is carried on the piston stem 112 below the piston head 110. The floating piston 116 is provided with appropriate seals 118 to prevent the passage of grease past the floating piston. The extent of travel of the floating piston 116 is limited on the top by a shoulder 117 formed in the interior of the snubber housing 92 and on the bottom by a snap ring 119 captured at a bottom end of the housing 92.

In operation, the interior of the cylinder 92 is charged with grease through the grease fitting 98 when the snubber 90 is in the position shown in FIG. 1. Thus, the piston head 110 is elevated to a point where it is very close to the cap 94. This represents the valve being in the open position. At this point, the air pressure within chamber 80 of the actuator is very high and the air pressure within chamber 82 is very low. The entire space within the cylinder 92, below the piston head 110 representing a lower chamber, is filled with a non-compressible such as grease or some other suitable (compressible or non-compressible) fluid, thus pressing the floating piston 116 down against the snap ring stop 119.

Figure 2:
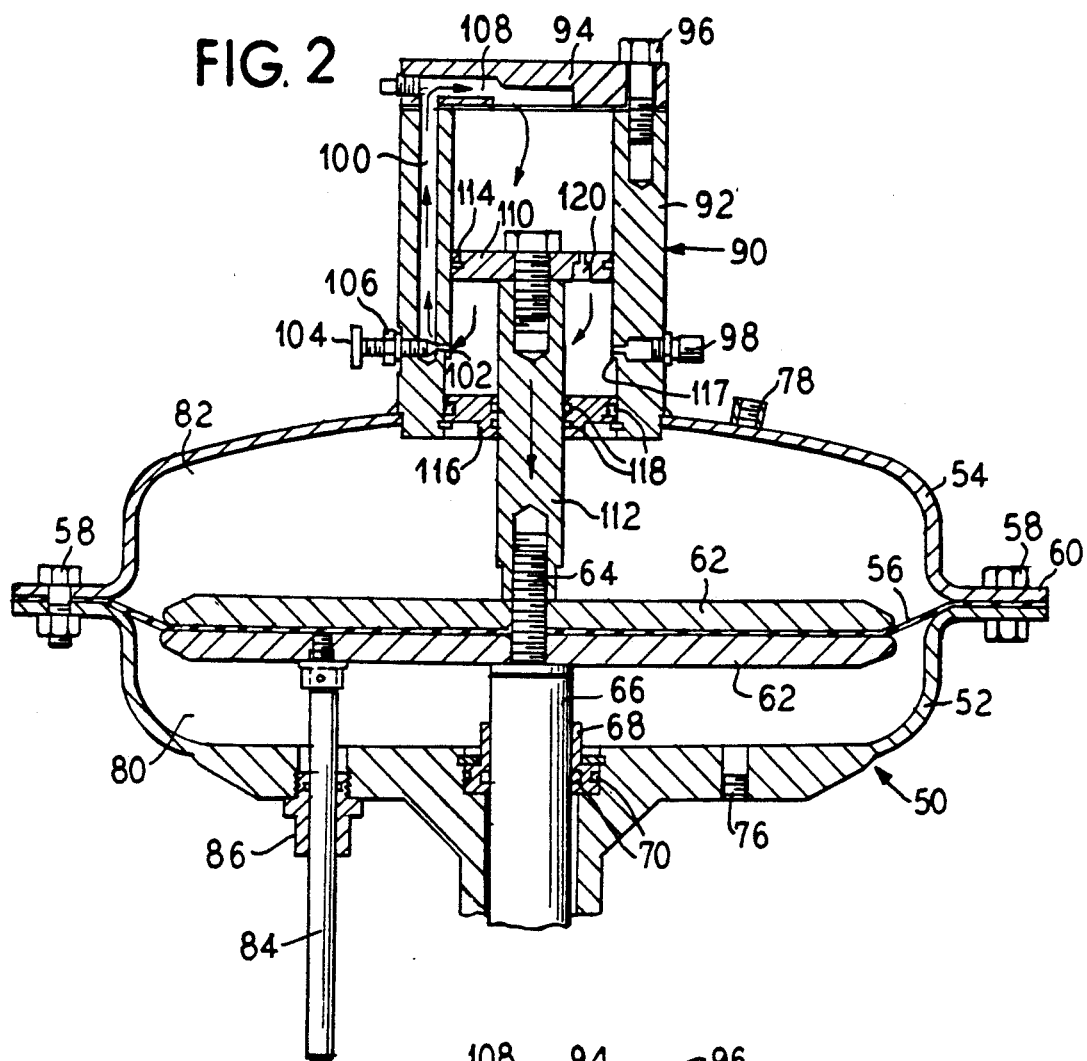
FIG. 2 is an enlarged side sectional view of the actuator and snubber.
Figure 3:
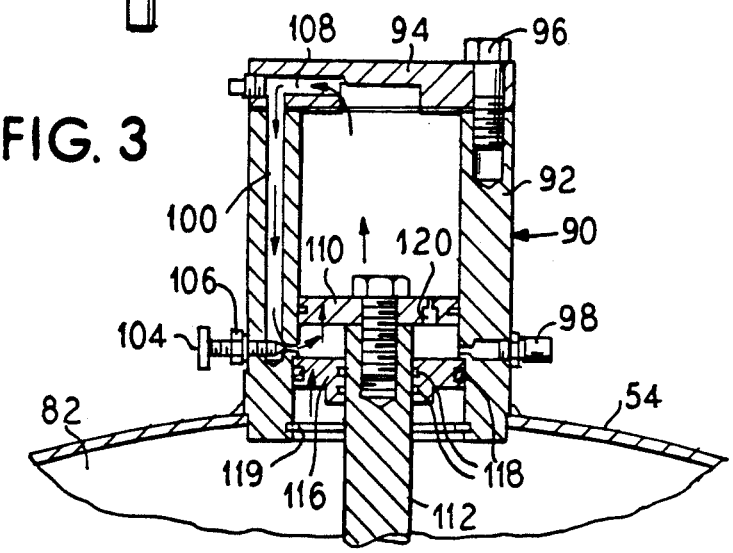
FIG. 3 is an enlarged view of the snubber showing movement of the floating piston.

As the valve is closed, air pressure within chamber 82 is increased by introducing air through inlet/outlet 78 and air pressure within chamber 80 is reduced by allowing the air to flow out through inlet/outlet 76. This causes the diaphragm to move downwardly thus carrying the actuator stem 66 and snubber piston stem 112 along with piston head 110 downwardly. This process is illustrated in FIG. 2. During this process grease flows through inlet 102, past the throttle screw 104, into passage 100 and passage 108 to return to the interior space of the cylinder 92 above the piston head 110, representing an upper chamber. Although the pressure within chamber 82 is on the increase during this process, the pressure of the grease within the lower snubber chamber, below the piston head 110 is greater, therefore the floating piston 116 is maintained in the downward position shown in FIG. 2. As the piston head continues to move downwardly, the volume within the cylinder 92 previously occupied by the piston stem 112 is significantly reduced, thereby creating a low pressure region in the chamber above the piston head 110. Once the piston head reaches the downward most extent of its travel, as shown in FIG. 3, the low pressure area above the piston head 110 causes grease to continue to flow through the inlet 102 and passages 100, 108, thereby permitting and causing the floating piston 116 to rise until it reaches the shoulders 117 formed within the cylinder 92 limiting its upward travel. The volume through which the floating piston 116 travels is approximately the same as the volume of the piston stem 112 removed from the cylinder 92 by its downward and outward travel, thereby maintaining an equalized pressure within the snubber 90.

To again open the valve, pressure within chamber 80 is increased and pressure within chamber 82 is decreased causing the diaphragm 56 to move upwardly carrying the piston head 119 upward as well. The grease then flows in a reverse direction from the upper snubber chamber through the passage 108 in the cover 94, then through passage 100 in the cylinder 92 and out through inlet 102 into the lower snubber chamber below the piston head. As the piston head 110 moves upwardly and into the cylinder, the free space within the cylinder 92 decreases and the floating piston 116 is caused to move downwardly to increase the effective volume within the cylinder.

By use of the adjustable throttle screw 104 the speed of the dampening action of the snubber 90 can be adjusted to prevent any sudden abrupt movements of the diaphragm 56. The bleed passage 120 prevents any damage or inoperative result in the event that the passage 102 is completely blocked by the throttle screw 104.

Provision of the floating piston 116 accommodates the changing effective volume within the cylinder 92 due to the insertion and removal of the piston stem 112 to permit smooth operation of the snubber 90. Provision of the floating piston also makes it possible to have a reservoir of grease available for use by the snubber.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A snubber for use in dampening the sudden movement of a movable member comprising:
   a snubber housing having an open interior space, said interior space having a pair of shoulder means;
   a floating piston closing said interior space and movable between and into engagement with said shoulder means to limit movement within said space while varying the volume of said open interior space;

a first piston having a piston head mounted to connecting member, said piston head reciprocably movable within said snubber housing and said connecting member extending out of said interior space and operably attached to said movable member to move therewith, said connecting rod protrudable into said space to a variable extent to reciprocate said piston head;

said first piston dividing said snubber housing space into two chambers, one on each side of said piston head;

a fluid pressure passage leading from one of said snubber chambers to the other to pressurize said each side of said piston head for dampening sudden movement of said movable member;

said floating piston having one side thereof in fluid pressure communication with one of said snubber chambers;

whereby, as said first piston reciprocates within said snubber space by said fluid pressure, said floating piston moves in an opposite direction relative to said space to accommodate the changing volume within said space occasioned by the movement of said connecting member into and out of said interior space, thereby maintaining an equalized pressure within said interior space and preventing sudden and abrupt movement of said movable member.

2. A snubber according to claim 1, wherein said first piston is restrained to reciprocate in a linear motion.

3. A snubber according to claim 1, wherein said piston head is sized to seal with an interior surface of said interior space.

4. A snubber according to claim 1, wherein said piston head comprises a circular disk shaped piston head and said connecting member comprises a rod-shaped piston stem, said piston stem being axially attached to said movable member.

5. A snubber according to claim 1, including adjustable means positioned in said passage to vary the cross sectional area of at least a portion of said passage.

6. A snubber according to claim 1, wherein said floating piston is slidingly carried on said first piston.

7. A diaphragm actuator and snubber comprising:
a diaphragm housing having a movable diaphragm therein dividing said diaphragm housing into two separate chambers;
an actuator stem connected to said diaphragm to move in response to means acting on said diaphragm;
a snubber housing having an open interior space communicating through a communication path with a first one of said diaphragm chambers, said interior space having a pair of shoulder means;
a floating piston closing said interior space and movable between and into engagement with said shoulder means to limit movement within said space while varying the volume of said open interior space;
a first piston having a piston head mounted to a connecting member, said piston head reciprocably movable within said snubber housing, said connecting member extending out of said interior space and operably connected to said actuator stem to move therewith, said connecting member variably protrudable into said space to reciprocate said piston head;
said first piston dividing said snubber housing space into two chambers, one on each side of said piston head;
a fluid pressure passage leading from one of said snubber chambers to the other to pressurize said each side of said piston head;
said floating piston having one side thereof in fluid said communication path between said first piston and said first diaphragm chamber;

whereby, as said first piston reciprocates within said snubber space by said fluid pressure, said floating piston moves in an opposite direction to accommodate the changing volume within said space occasioned by the movement of said connecting member into and out of said interior space, thereby maintaining an equalized pressure within said interior space and preventing sudden and abrupt movement of said movable diaphragm.

8. A diaphragm actuator and snubber according to claim 7, wherein said first piston is restrained to reciprocate in a linear motion.

9. A diaphragm actuator and snubber according to claim 7, wherein said piston head is sized to seal with an interior surface of said interior space.

10. A diaphragm actuator and snubber according to claim 7, wherein said snubber housing comprises to a hollow cylinder.

11. A diaphragm actuator and snubber according to claim 10, wherein said piston head comprises a circular piston head and said connecting member comprises a piston stem, said piston stem being axially attached to said actuator stem.

12. A diaphragm actuator and snubber according to claim 7, including adjustable means positioned in said passage to vary the cross sectional area of at least a portion of said passage.

13. A diaphragm actuator and snubber according to claim 12, wherein said adjustable means comprises a throttle screw extending through a wall of said snubber housing and into said passage such the it can be moved into and out of said passage to vary the cross sectional area of a portion of said passage.

14. A diaphragm actuator and snubber according to claim 7, wherein said floating piston is slidingly carried on said first piston.

15. A diaphragm actuator and snubber according to claim 7, wherein said floating piston is sized to completely block said communication path between said snubber housing space and said first actuator chamber.

16. A diaphragm actuator and snubber comprising:
a hollow diaphragm housing having a movable diaphragm therein dividing said diaphragm housing into two separate chambers;
an actuator stem connected to said diaphragm to move in a linear fashion in response to means acting on said diaphragm;
a hollow cylindrical snubber housing secured to said diaphragm actuator and having an open interior space communicating through a communication path with a first one of said diaphragm chambers, said interior space having a pair of shoulder means;
a floating piston closing said interior space and movable between and into engagement with said shoulder means to limit movement within said space while varying the volume of said open interior space;

a first piston having piston head mounted to a connecting member, said piston head reciprocably movable within said snubber housing, said connecting member operably connected to said actuator stem to move in a linear fashion therewith;

said piston head being sized to seal with an interior surface of said space formed within said snubber housing to divide said space into two chambers, one on each side of said piston head;

a fluid pressure passage leading from one of said snubber chambers to the other to pressurize said each side of said piston head to dampening sudden movement of said movable diaphragm;

adjustable means positioned in said passage to vary the cross sectional area of at least a portion of said passage;

said floating piston having one side thereof in fluid pressure said communication path between said first piston and said first diaphragm chamber;

whereby, as said piston head reciprocates within said snubber space by said fluid pressure, said floating piston moves in an opposite direction to accommodate the changing volume within said space occasioned by the movement of said connecting member into and out of said snubber space, thereby maintaining an equalized pressure within said interior space and preventing sudden and abrupt movement of said movable diaphragm.

17. A diaphragm actuator and snubber according to claim 16, wherein said piston head comprises a circular piston head and said connecting member comprises a piston stem, said piston stem being axially attached to said actuator stem.

18. A diaphragm actuator and snubber according to claim 16, wherein said adjustable means comprises a throttle screw extending through a wall of said snubber housing and into said passage such the it can be moved into and out of said passage to vary the cross sectional area of a portion of said passage.

19. A diaphragm actuator and snubber according to claim 16, wherein said floating piston is slidingly carried on said first piston.

20. A diaphragm actuator and snubber according to claim 19, wherein said floating piston is sized to completely block said communication path between said snubber housing space and said first actuator chamber.

* * * * *